(12) United States Patent
Baluch

(10) Patent No.: US 10,150,438 B2
(45) Date of Patent: Dec. 11, 2018

(54) REAR EXHAUST FINISHER ASSEMBLY

(71) Applicant: Nissan North America, Inc., Franklin, TN (US)

(72) Inventor: Stephen Baluch, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/585,453

(22) Filed: May 3, 2017

(65) Prior Publication Data

US 2018/0319357 A1    Nov. 8, 2018

(51) Int. Cl.
*B60R 19/48* (2006.01)
*F01N 13/08* (2010.01)

(52) U.S. Cl.
CPC .......... *B60R 19/48* (2013.01); *F01N 13/082* (2013.01)

(58) Field of Classification Search
CPC ....... F01N 13/20; F01N 13/082; B60K 13/04; B60K 13/06; B60R 19/48
See application file for complete search history.

(56) References Cited

U.S. PATENT DOCUMENTS

| 2,629,455 | A | * | 2/1953 | Cushman | F01N 13/082 |
| | | | | | 138/46 |
| 2,716,463 | A | * | 8/1955 | Latulippe | F01N 1/085 |
| | | | | | 181/267 |
| 2,841,232 | A | * | 7/1958 | Loeffler | B60K 13/04 |
| | | | | | 180/89.2 |
| 2,854,278 | A | * | 9/1958 | Zerhan, Jr. | B60K 13/06 |
| | | | | | 285/49 |
| 2,864,406 | A | * | 12/1958 | Schewel | F01N 13/20 |
| | | | | | 239/505 |
| 2,868,229 | A | * | 1/1959 | Russell | F01N 13/20 |
| | | | | | 239/132.3 |
| 2,902,102 | A | * | 9/1959 | Gorman | B60K 13/06 |
| | | | | | 180/309 |
| 2,951,724 | A | * | 9/1960 | Morrish | B60R 19/48 |
| | | | | | 285/48 |
| 3,685,612 | A | * | 8/1972 | Bertin | F01N 13/20 |
| | | | | | 181/213 |
| 3,685,615 | A | | 8/1972 | Rutt | |
| 5,371,331 | A | * | 12/1994 | Wall | F01N 1/24 |
| | | | | | 181/227 |

(Continued)

OTHER PUBLICATIONS

Mercedes Exhaust Systems, 2015.

*Primary Examiner* — Emma K Frick
*Assistant Examiner* — Brian L Cassidy
(74) *Attorney, Agent, or Firm* — Global IP Counselors, LLP

(57) ABSTRACT

A rear exhaust finisher assembly has a housing with a hollow interior, an input end and an output end. The input end has an inlet opening that is open to the hollow interior. The output end has two exhaust openings adjacent to one another. The two exhaust opening are open to the hollow interior with a baffle structure being defined between the two exhaust openings. The baffle structure is shaped and configured to cause exhaust gases moving in a gas-flow direction through the hollow interior of exhaust finisher to experience at least a partial change in direction as the exhaust gases move past the baffle structure.

19 Claims, 12 Drawing Sheets

(56) References Cited

U.S. PATENT DOCUMENTS

| | | | | |
|---|---|---|---|---|
| 5,877,461 A * | 3/1999 | Karlsson | | B27B 17/00 |
| | | | | 181/230 |
| 7,007,720 B1 | 3/2006 | Chase et al. | | |
| 7,159,692 B1 * | 1/2007 | Frederiksen | | F01N 1/08 |
| | | | | 181/227 |
| D641,676 S * | 7/2011 | Lemon | | D12/194 |
| 8,550,122 B2 * | 10/2013 | Derry | | B21D 39/04 |
| | | | | 138/108 |
| 8,550,208 B1 * | 10/2013 | Potokar | | F02K 3/075 |
| | | | | 181/212 |
| 8,671,671 B1 * | 3/2014 | Spencer-Smith | | F01N 13/082 |
| | | | | 60/324 |
| 8,707,689 B1 * | 4/2014 | Spencer-Smith | | F01N 13/082 |
| | | | | 60/324 |
| 9,670,821 B2 * | 6/2017 | Nowka | | F01N 13/08 |
| 9,835,075 B2 * | 12/2017 | Lee | | F01N 13/082 |
| 2003/0037983 A1 * | 2/2003 | Hanaya | | B60K 13/04 |
| | | | | 180/309 |
| 2004/0163874 A1 * | 8/2004 | Rinklin | | B60K 13/04 |
| | | | | 180/309 |
| 2007/0039318 A1 * | 2/2007 | Krajewski | | F01N 13/082 |
| | | | | 60/317 |
| 2008/0036222 A1 * | 2/2008 | Iwamoto | | F01N 13/082 |
| | | | | 293/113 |
| 2009/0071136 A1 | 3/2009 | Smith | | |
| 2009/0188248 A1 * | 7/2009 | Saunders | | F01N 13/082 |
| | | | | 60/324 |
| 2010/0083647 A1 | 4/2010 | Dickinson et al. | | |
| 2010/0096865 A1 * | 4/2010 | McKee | | B60K 13/02 |
| | | | | 293/113 |
| 2010/0107616 A1 * | 5/2010 | Janakiraman | | F01N 3/05 |
| | | | | 60/317 |
| 2010/0307145 A1 * | 12/2010 | Son | | F01N 13/082 |
| | | | | 60/324 |
| 2014/0316749 A1 * | 10/2014 | Zhang | | G06F 17/5095 |
| | | | | 703/1 |
| 2015/0136515 A1 * | 5/2015 | Nowka | | B60K 13/04 |
| | | | | 180/309 |
| 2017/0198623 A1 * | 7/2017 | Lee | | F01N 13/082 |
| 2017/0370270 A1 * | 12/2017 | Endo | | F01N 13/082 |

* cited by examiner

REAR EXHAUST FINISHER ASSEMBLY

BACKGROUND

Field of the Invention

The present invention generally relates to a rear exhaust finisher assembly. More specifically, the present invention relates to rear exhaust finisher assembly that defines two outlets with an internal air baffle structure located between the two outlets.

Background Information

Exhaust finishers are typically decorative structures that are visible parts of an exhaust system of at the rear of a vehicle.

SUMMARY

On object is to provide an exhaust finisher that includes an air baffle structure between two outlets of the exhaust finisher.

In view of the state of the known technology, one aspect of the present disclosure is to provide a vehicle body structure with an exhaust system that includes a rear exhaust finisher assembly. The vehicle body structure includes a rear bumper fascia having an inboard surface and an outboard surface. The rear bumper fascia is attached to a rear end of the vehicle body structure. The rear bumper fascia has at least one opening. The exhaust system is installed beneath the vehicle body structure and includes at least one exhaust pipe that extends rearward toward the rear bumper fascia. The exhaust finisher has a housing with a hollow interior, an input end and an output end. A gas-flow direction is defined as a direction in which gases move from the input end to the output end. The exhaust finisher extends through the at least one opening and is attached to the rear bumper fascia. The input end extends inboard from the inboard surface of the rear bumper fascia and the output end extending rearward from the outboard surface of the rear bumper fascia. The input end has an inlet opening that is open to the hollow interior and is positioned adjacent to the exhaust pipe receiving exhaust gases therefrom. The output end has two exhaust openings adjacent to one another. The two exhaust openings are open to the hollow interior. A baffle structure is defined between the two exhaust openings and is shaped and configured to cause exhaust gases moving in the gas-flow direction through the hollow interior of exhaust finisher to experience at least a partial change in direction as the exhaust gases move past the baffle structure.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
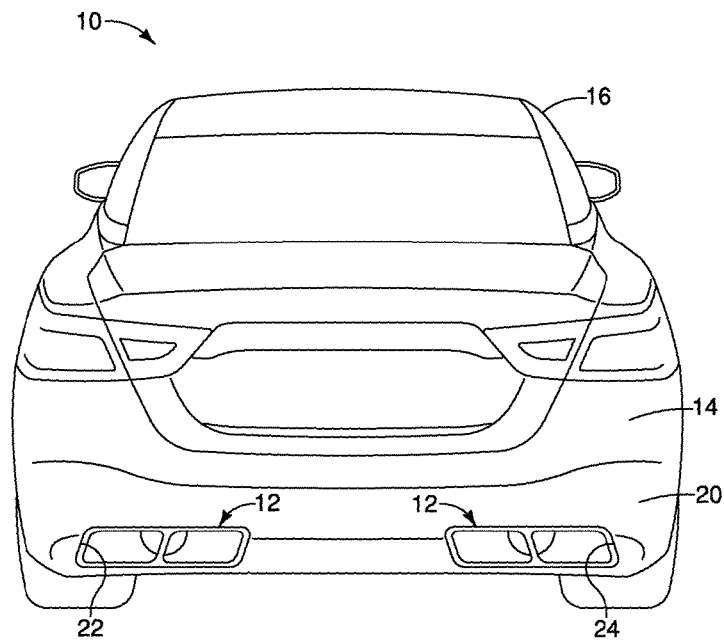
FIG. 1 is a rear view of a vehicle showing a bumper fascia with two exhaust finisher assemblies in accordance with a first embodiment.

Referring initially to FIG. 1, a vehicle 10 having an exhaust finisher assembly 12 installed to a rear end 14 of a vehicle body structure 16 of the vehicle 10, is illustrated in accordance with a first embodiment.

Figure 2:
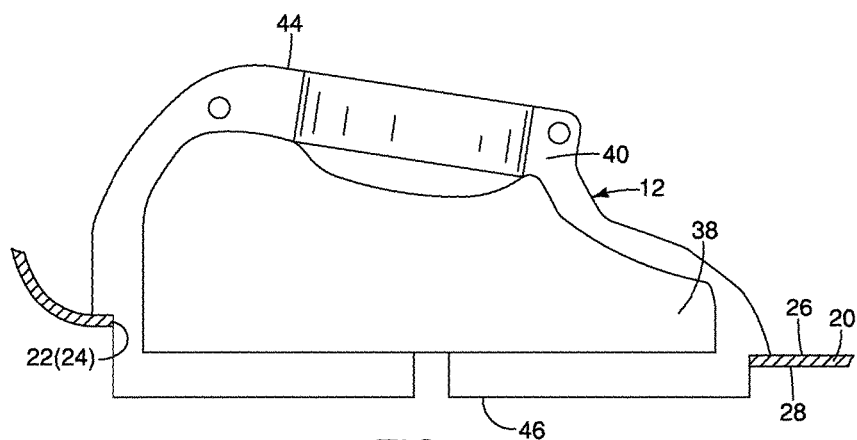
FIG. 2 is a top view of one of the exhaust finisher assemblies shown removed from the vehicle in accordance with the first embodiment.

The rear end 14 of the vehicle body structure 16 includes a bumper structure (not shown) that is concealed by a rear bumper fascia 20. The rear bumper fascia 20 defines at least one opening 22 and optionally a second opening 24. In the depicted embodiment, the rear bumper fascia 20 includes both the opening 22 and the opening 24. As shown in FIG. 2, the opening 22 (and the opening 24) extends from an inboard surface 26 (a forward-facing surface) to an outboard surface 28 (a rearward facing surface).

Figure 3:
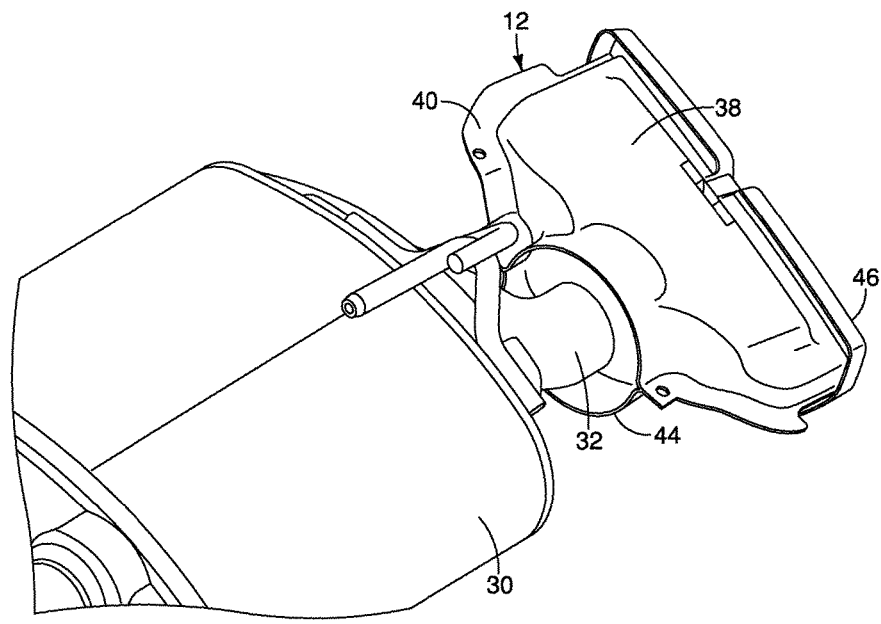
FIG. 3 is a perspective view of a portion of an exhaust system and the exhaust finisher assembly in accordance with the first embodiment.

The vehicle 10 also includes an exhaust system 30 that is installed beneath the vehicle body structure 16. As shown in FIG. 3, the exhaust system 30 includes at least one exhaust pipe 32 that extends rearward toward the rear bumper fascia 20 and toward the exhaust finisher assembly 12.

It should be understood from the drawings and the description herein that the vehicle 10 depicted in the drawings can include two separate exhaust systems 30 and two corresponding exhaust finisher assemblies 12. Since the two separate exhaust systems 30 and the two corresponding exhaust finisher assemblies 12 are basically identical, except that they are symmetrically mirror images of one another, description of only one exhaust system 30 and only one exhaust finisher assemblies 12 is provided herein below for the sake of brevity. It should be understood that description of one of the exhaust systems 30 applies equally to both, and description of one of the exhaust finisher assemblies 12 applies equally to both.

The exhaust finisher assembly 12 (hereinafter referred to as the exhaust finisher 12) has a housing 34 that can be assembled in any of a variety of ways. In the depicted embodiment, the housing 34 is assembled from a plurality of metallic elements including a lower half shell 36 and an upper half shell 38 that are fitted together to define the overall exterior of the exhaust finisher 12. However, it should be understood from the drawings and the description herein, that the exhaust finisher 12 can be manufactured from differing shaped panels that, when assembled, define a desired overall shape such as the shape shown in FIGS. 1-7.

Figure 4:
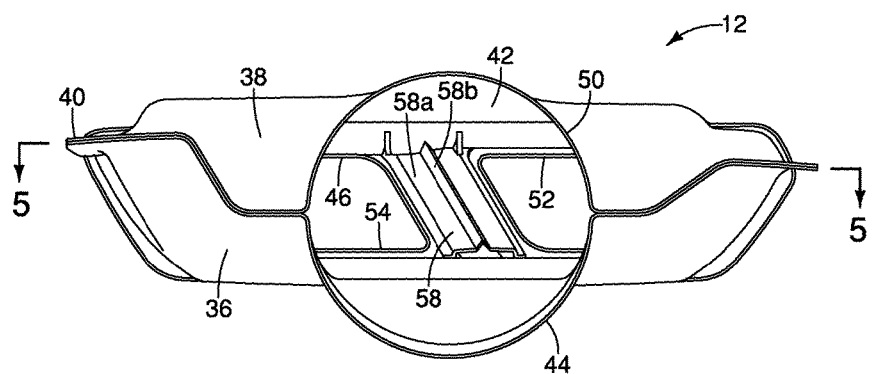
FIG. 4 is a front view of the exhaust finisher assembly showing a housing having a lower half shell, an upper half shell, a hollow interior as viewed through an inlet opening revealing two outlet openings and a baffle structure located between the two outlet openings within the hollow interior in accordance with the first embodiment.

As shown in FIGS. 2-4, the housing 34 defines an attachment flange 40 that includes fastener receiving openings for attachment to the rear bumper fascia 20. The housing 34 also defines a hollow interior 42, an input end 44 and an output end 46. The housing 34 basically defines a diffuser with the input end 44 being narrower than the output end 46. A gas-flow direction $D_1$ is defined as a direction in which gases move from the input end 44 to the output end 46. Accordingly, as exhaust gases move through the hollow interior 42 of the housing 34, the gases are drawn toward the output end 46 since the output end 46 is wider than the input end 44 in a conventional manner in accordance with diffuser principles.

As shown in FIG. 2, the exhaust finisher 12 extends through the opening 22 (opening 24) and is attached to the rear bumper fascia 20 by fasteners (not shown) that extend through openings in the attachment flange 40. Consequently, the input end 44 extends inboard (forward) from the inboard surface 26 of the rear bumper fascia 20, and the output end 46 extends rearward from the outboard surface 26 of the rear bumper fascia 20.

Figure 5:
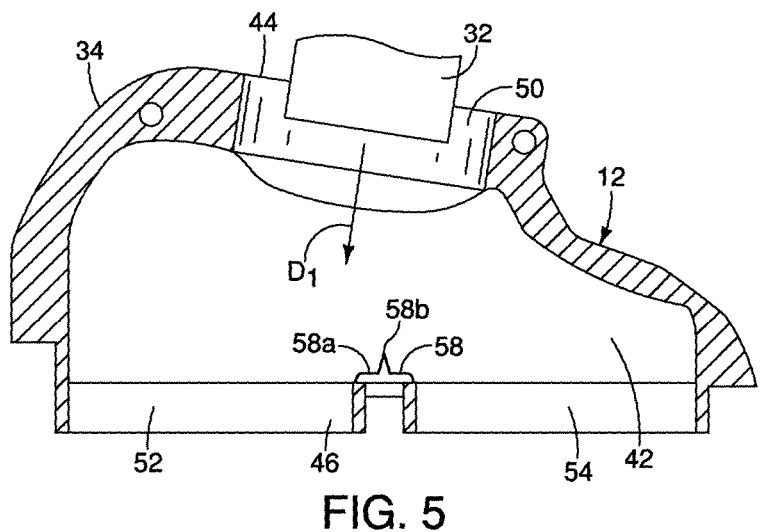
FIG. 5 is a cross-sectional top view of the exhaust finisher showing the inlet opening, the two outlet openings and the baffle structure between the two outlet openings in accordance with the first embodiment.
Figure 6:
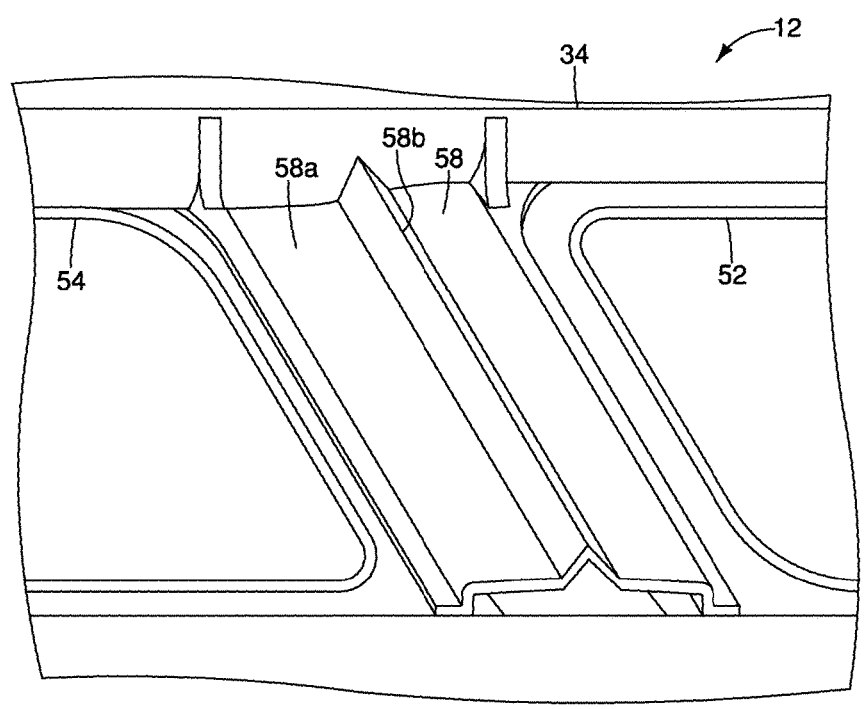
FIG. 6 is a perspective view of a portion of the hollow interior of the exhaust finisher assembly showing the baffle structure in accordance with the first embodiment.

The input end 44 of the exhaust finisher 12 has an inlet opening 50 that is open to the hollow interior 42 of the housing 34. The input end 44 is also positioned adjacent to the exhaust pipe 32 receiving exhaust gases therefrom, as shown in FIGS. 3 and 5. Preferably, the exhaust pipe 32 extends into the inlet opening 50, but is not in contact with the housing 34 of the exhaust finisher assembly 12. Preferably, the exhaust pipe 32 is concentrically disposed relative to the inlet opening 50, but being concentric therewith is not a requirement. However, it is preferred that the exhaust pipe 32 has a non-contacting relationship with the inlet opening 50 and the housing 34 of the exhaust finisher 12.

The output end 46 of the exhaust finisher 12 has two exhaust openings 52 and 54 that are adjacent to one another. The exhaust openings 52 and 54 are also open to the hollow interior 42. The exhaust openings 52 and 54 are separated from one another by a baffle structure 58 that has a nondescript exterior appearance. However, within the hollow interior 42 of the exhaust finisher 12, the baffle structure 58 has a specific shape and serves a specific purpose, as described further below.

In the first embodiment depicted in FIGS. 4-7, the baffle structure 58 is defined between the two exhaust openings 52 and 54 within the hollow interior 42. The baffle structure 58 is shaped and configured to cause exhaust gases moving in the gas-flow direction $D_1$ through the hollow interior 42 of exhaust finisher 12 to experience at least a partial change in direction as the exhaust gases move past the baffle structure 58.

The baffle structure 58 can be integrally formed with one or the other of the lower half shell 36 and the upper half shell 38, or can be made in two parts with one part being formed with the lower half shell 36 and the other part being formed with the upper half shell 38. Alternatively, as shown in the first embodiment, the baffle structure 58 can be a separate element welded or otherwise fixedly attached to the surfaces of the hollow interior 42 of the housing 34 of the exhaust finisher 12.

Figure 7:
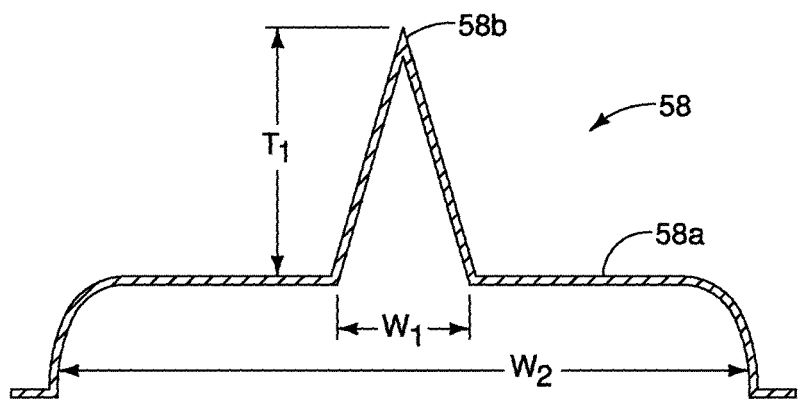
FIG. 7 is a cross-sectional view of the baffle structure shown removed from the exhaust finisher assembly in accordance with the first embodiment.

In the first embodiment, the baffle structure 58 includes an interior surface 58a that faces forward (relative to the vehicle 10) and further faces the hollow interior 42 of the housing 34. The interior surface 58a has a projection 58b that extends from a lower area of the baffle structure 58 to an upper area of the baffle structure 58. The projection 58b further extends within the hollow interior 42 in a direction opposite the gas-flow direction $D_1$ toward the input end 44. The distal edge of the projection 58b basically defines a ridge. As shown in FIG. 7, the projection 58b of the baffle structure 58 is centered relative to opposite lateral sides thereof and is also centered between the exhaust openings 52 and 54. However, the baffle structure 58 and the projection 58b are inclined relative to vertical, with a top end of the projection 58b being closer to a center of the vehicle 10 than a bottom end thereof. More specifically, the baffle structure 58 and the projection 58b extend from a lower side of the housing 34 to an upper side of the housing 34 between the two exhaust openings 52 and 54 defining an angle of between 20 and 40 degrees relative to vertical.

Since the projection 58b extends in a direction opposite the gas-flow direction $D_1$ and toward the input end 44, exhaust gases experience at least a partial change in direction within the hollow interior 42 thereby having an effect on the overall air flow and noise generation of the exhaust gases exiting the housing 34 via the exhaust openings 52 and 54.

As shown in FIG. 7, the projection 58b has an overall triangular shape, as viewed in cross-section from above (or below). The base (rearward end) of the projection 58b has an overall width $W_1$, and the baffle structure 58 has an overall width $W_2$. In the embodiment depicted in FIG. 7, the width $W_1$ is between 20% and 30% of the width $W_2$. Preferably, the width $W_1$ is approximately 25% of the width $W_2$. The projection 58b extends from the interior surface 58a a thickness $T_1$. The thickness $T_1$ is less than half of the width $W_2$, but can be any values from 10% of the width $W_2$, to 100% of the width $W_2$.

Figure 8:
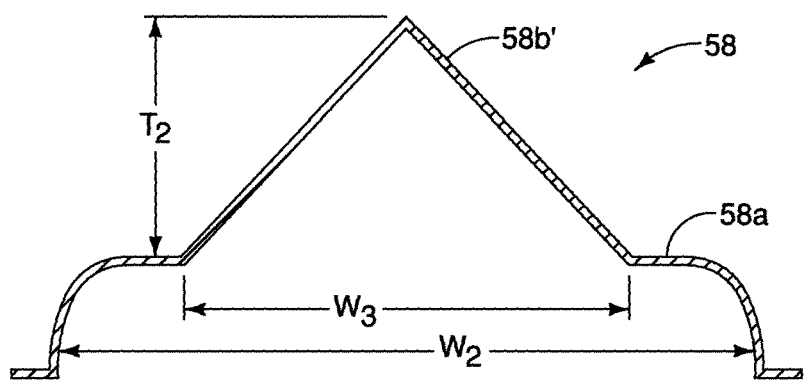
FIG. 8 is a cross-sectional view of a modified baffle structure shown removed from the exhaust finisher assembly in accordance with the first embodiment.

Further, as demonstrated in a modification of the first embodiment shown in FIG. 8, the base of the projection 58b can be modified to define a projection 58b' that can have a width $W_3$ that is between 30% and 80% of the width $W_2$. In FIG. 8, the width $W_3$ is approximately 75% of the width $W_2$.

Second Embodiment

Figure 9:
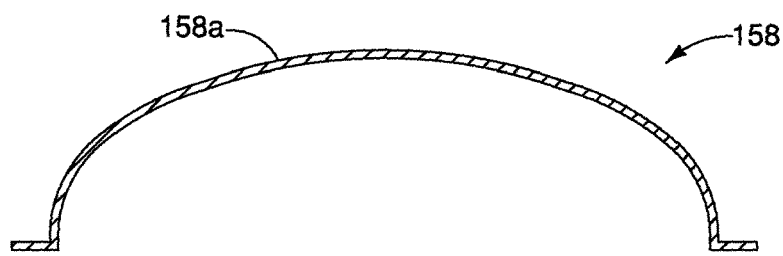
FIG. 9 is a cross-sectional view of a baffle structure shown removed from the exhaust finisher assembly in accordance with a second embodiment.
Figure 10:
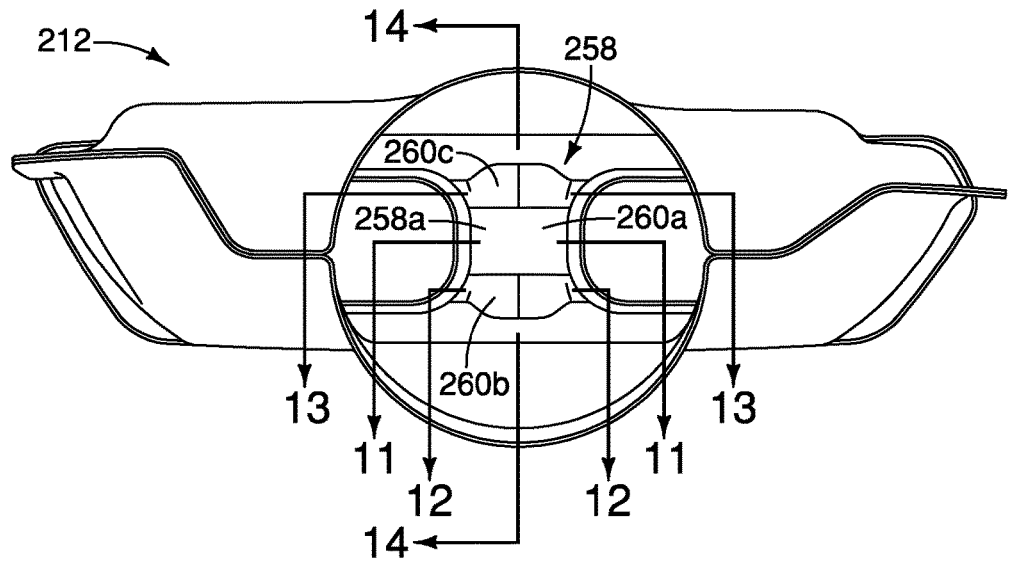
FIG. 10 is a front view of an exhaust finisher assembly showing a baffle structure within a hollow interior of the exhaust finisher assembly as viewed through an inlet opening in accordance with a third embodiment.
Figure 11:
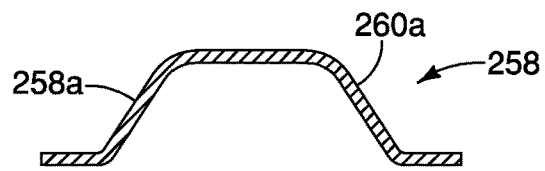
FIG. 11 is a cross-sectional view of the baffle structure taken along the line 11-11 in FIG. 10, showing the baffle structure removed from the exhaust finisher assembly in accordance with the third embodiment.
Figure 12:
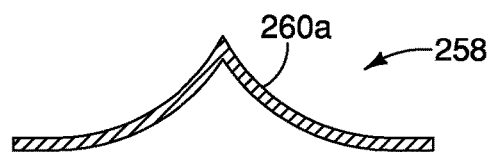
FIG. 12 is another cross-sectional view of the baffle structure taken along the line 12-12 in FIG. 10, showing the baffle structure removed from the exhaust finisher assembly in accordance with the third embodiment.
Figure 13:
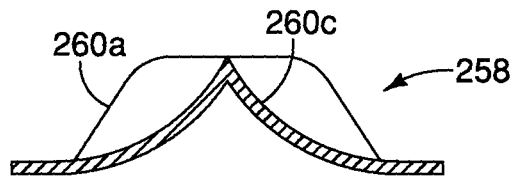
FIG. 13 is another cross-sectional view of the baffle structure taken along the line 13-13 in FIG. 10, showing the baffle structure removed from the exhaust finisher assembly in accordance with the third embodiment.
Figure 14:
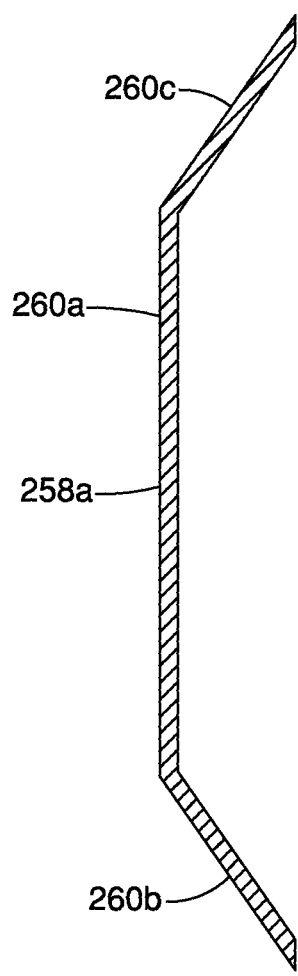
FIG. 14 is yet another cross-sectional view of the baffle structure taken along the line 14-14 in FIG. 10, showing the baffle structure removed from the exhaust finisher assembly in accordance with the third embodiment.

Referring now to FIG. 9, a baffle structure 158 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The baffle structure 158 in accordance with the second embodiment replaces the baffle structure 58 of the first embodiment within the exhaust finisher 12. The baffle structure 158 has an interior surface 158a that defines a projection, however the projection defined by the interior surface 158a is curved or semi-circular as viewed from above (or below) in cross-section.

Third Embodiment

Referring now to FIGS. 10-14, an exhaust finisher assembly 212 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the exhaust finisher assembly 212 includes a baffle structure 258 with an interior surface 258a that defines a projection that includes a first portion 260a, a second portion 260b and a third portion 260c. The first portion 260a is shown in cross-section in FIGS. 11 and 14, and has an overall trapezoidal shape with rounded or chamfered edges. The second portion 260b is shown in cross-section in FIGS. 12 and 14, and has curved surfaces that are concaved. The surfaces that define the second portion 260b taper down from the outer surface of the first portion 260a to blend in to the inner surface of the exhaust finisher assembly 212. The third portion 260c is shown in cross-section in FIGS. 13 and 14, and has curved surfaces that are concaved. Similar to the second portion 260b, the surfaces that define the third portion 260c taper down from the outer surface of the first portion 260a to blend in to the inner surface of the exhaust finisher assembly 212.

Further, in the third embodiment, the baffle structure 258 is approximately vertically oriented.

Fourth Embodiment

Figure 15:
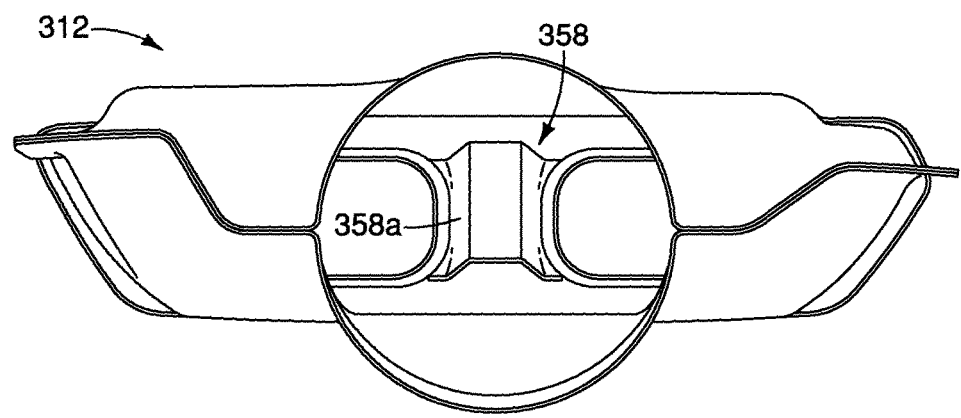
FIG. 15 is a front view of an exhaust finisher assembly showing a baffle structure within a hollow interior of the exhaust finisher assembly as viewed through an inlet opening in accordance with a fourth embodiment.
Figure 16:
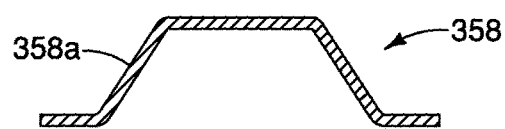
FIG. 16 is a cross-sectional view of the baffle structure shown removed from the exhaust finisher assembly in accordance with the fourth embodiment.

Referring now to FIGS. 15-16, an exhaust finisher assembly 312 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the exhaust finisher assembly 312 includes a baffle structure 358 with an interior surface 358a that defines a projection having a trapezoid or box-like shape, as viewed in cross-section in FIG. 16. The baffle structure 358 can be assembled from several separate panels joined together via welding techniques, or pressed from a single metal panel.

Further, in the fourth embodiment, the baffle structure 258 is approximately vertically oriented.

Fifth Embodiment

Figure 17:
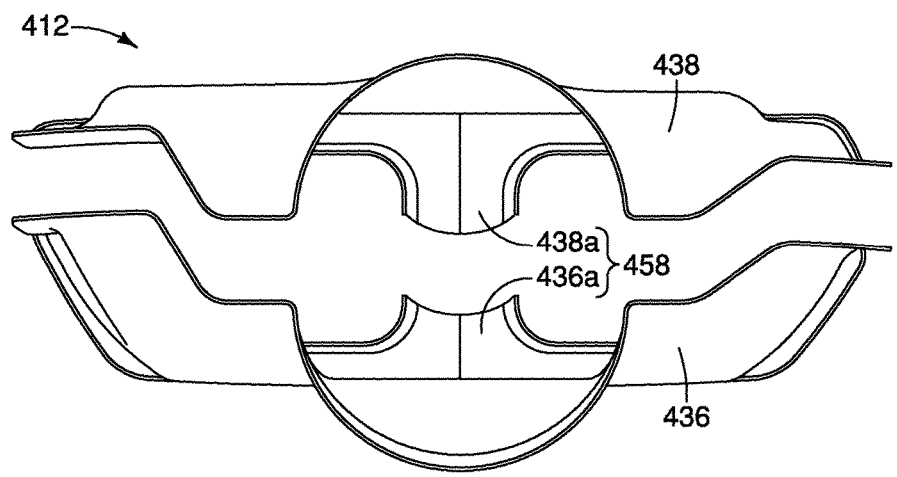
FIG. 17 is an exploded front view of an exhaust finisher assembly showing a housing having a lower half shell, an upper half shell, with a lower portion of a baffle structure being provided on the lower half shell and an upper portion of a baffle structure being provided on the upper half shell in accordance with a fifth embodiment.
Figure 18:
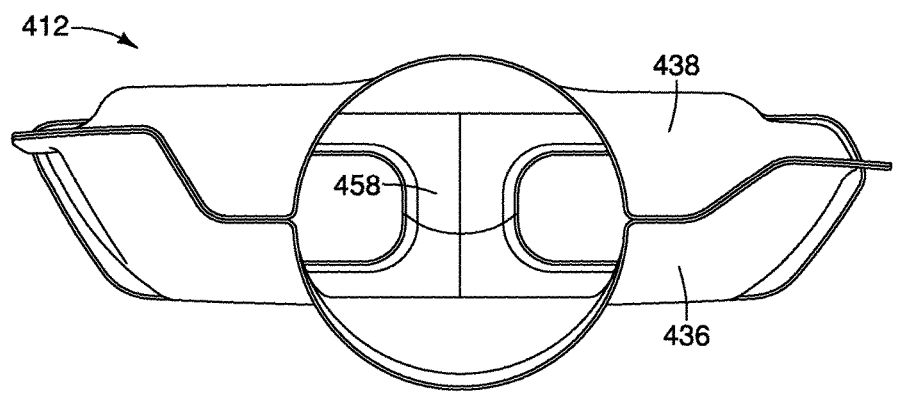
FIG. 18 is a front view of the exhaust finisher assembly showing the baffle structure within a hollow interior of the exhaust finisher assembly as viewed through an inlet opening in accordance with the fifth embodiment.
Figure 19:
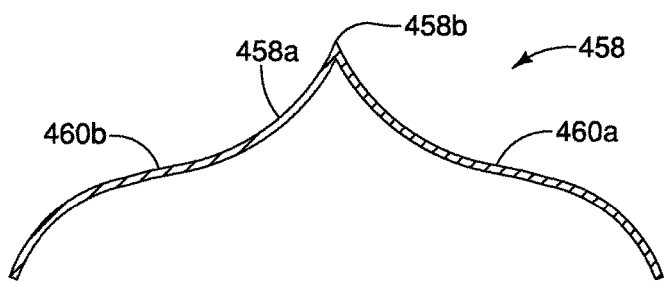
FIG. 19 is a cross-sectional view of the baffle structure shown removed from the exhaust finisher assembly in accordance with the fifth embodiment.

Referring now to FIGS. 17-19, an exhaust finisher assembly 412 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the exhaust finisher assembly 412 includes a lower half shell 436 and an upper half shell 438. As shown in FIG. 17, the lower half shell 436 includes an upwardly extending projection 436a and the upper half shell 438 includes a downwardly extending projection 438a. The projection 436a and 438a define a baffle structure 458, when the lower half shell 436 and the upper half shell 438 are joined together to define the housing of the exhaust finisher 412. The baffle structure 458 has an interior surface 458a that defines a vertically oriented projection 458b, as shown in FIGS. 18 and 19.

As shown in FIG. 19, the projection 458b basically defines a ridge that extends along the edge of the projection 458b. The interior surface 458a of the baffle structure 412 is defined by a first surface section 460a that extends from the ridge in a first lateral direction, and a second surface section 460b that extends from the ridge in a second lateral direction opposite the first lateral direction, the first surface section and the second surface section having symmetrical curved serpentine shapes as viewed from above.

In other words, the interior surface 458a has a symmetrical serpentine like-shape on either side of the projection 458b. However, the interior surface 458a can have any of a variety of profiles when viewed in cross-section, such as those described above in the first, second and third embodiments.

Sixth Embodiment

Figure 20:
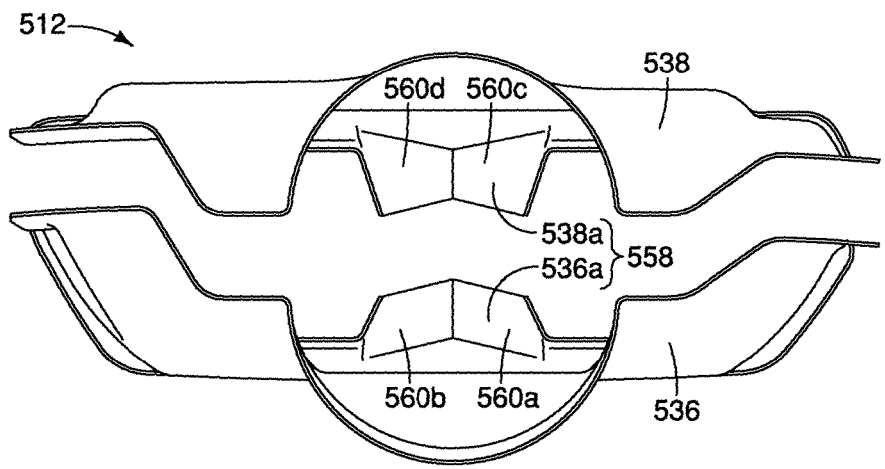
FIG. 20 is an exploded front view of an exhaust finisher assembly showing a housing having a lower half shell, an upper half shell, with a lower portion of a baffle structure being provided on the lower half shell and an upper portion of a baffle structure being provided on the upper half shell in accordance with a sixth embodiment.
Figure 21:
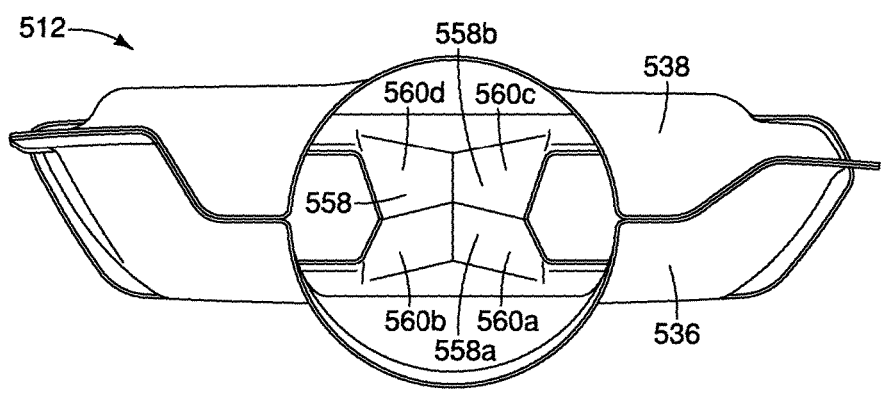
FIG. 21 is a front view of the exhaust finisher assembly showing the baffle structure within a hollow interior of the exhaust finisher assembly as viewed through an inlet opening in accordance with the sixth embodiment.

Referring now to FIGS. 20-21, an exhaust finisher assembly 512 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the exhaust finisher assembly 512 includes a lower half shell 536 and an upper half shell 538. As shown in FIG. 20, the lower half shell 536 includes an upwardly extending projection 536a and the upper half shell 538 includes a downwardly extending projection 538a. The projection 536a and 538a define a baffle structure 558, when the lower half shell 536 and the upper half shell 538 are joined together to define the housing of the exhaust finisher 512. The projection 536a includes two planar surfaces 560a and 560b. The projection 538a includes two planar surfaces 560c and 560d. The planar surfaces 560a and 560b are angularly offset from one another such that their intersection defines a lower portion of the projection 558b. Similarly, the planar surfaces 560c and 560d are angularly offset from one another such that their intersection defines an upper portion of the projection 558b.

Hence, in the sixth embodiment, the interior surface 558a is defined by the planar surfaces 560a, 560b, 560c and 560d. Further, the projection 558b (the ridge) is defined at the intersection of planar surfaces 560a and 560b and the intersection of planar surface 560c and 560d. The projection 558b is vertically oriented and extends in a forward direction relative to the vehicle 10.

Seventh Embodiment

Figure 22:
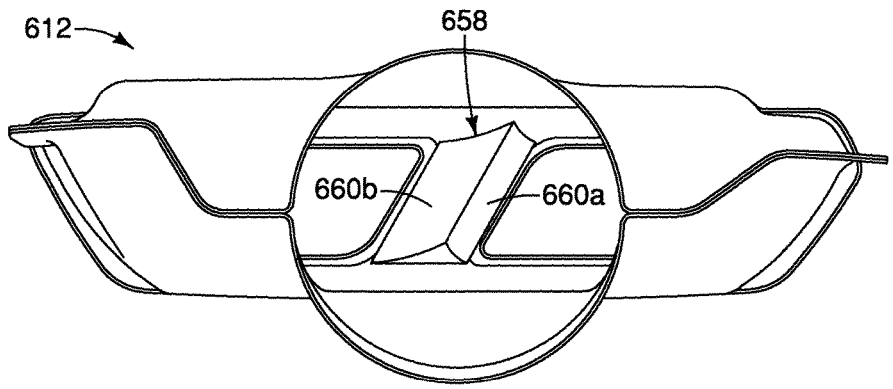
FIG. 22 is a front view of an exhaust finisher assembly showing a housing having a hollow interior as viewed through an inlet opening revealing two outlet openings and a baffle structure located between the two outlet openings within the hollow interior in accordance with a seventh embodiment.
Figure 23:
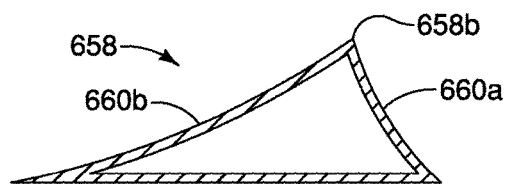
FIG. 23 is a cross-sectional view of the baffle structure shown removed from the exhaust finisher assembly in accordance with the seventh embodiment.

Referring now to FIGS. 22-23, an exhaust finisher assembly 612 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the parts of the first embodiment may be omitted for the sake of brevity.

In the seventh embodiment, the exhaust finisher assembly 612 includes a baffle structure 658 with two interior surfaces 660a and 660b. The intersection of the two interior surfaces 660a and 660b that defines an off-center projection, as viewed in cross-section in FIG. 23. The projection at the intersection of the two interior surfaces 660a and 660b is off-center relative to the two exhaust openings such that the projection is closer to one of the exhaust openings than to the other of the exhaust openings. Further, each of the two interior surfaces 660a and 660b is curved, as viewed in FIG. 20, with each of two interior surfaces 660a and 660b being concaved.

Eighth Embodiment

Figure 24:
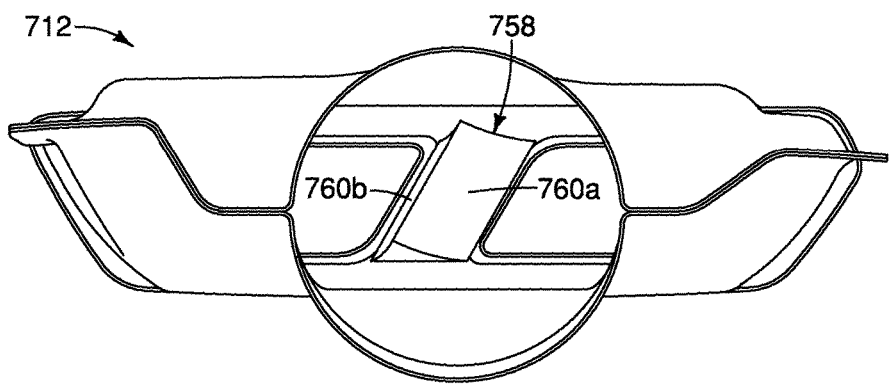
FIG. 24 is a front view of an exhaust finisher assembly showing a housing having a hollow interior as viewed through an inlet opening revealing two outlet openings and a baffle structure located between the two outlet openings within the hollow interior in accordance with an eighth embodiment.
Figure 25:
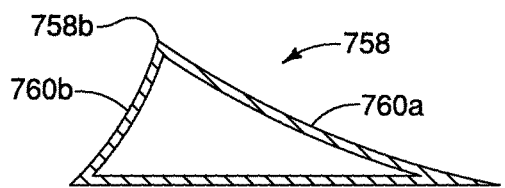
FIG. 25 is a cross-sectional view of the baffle structure shown removed from the exhaust finisher assembly in accordance with the eighth embodiment.

Referring now to FIGS. 24-25, an exhaust finisher assembly 712 in accordance with an eighth embodiment will now be explained. In view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

In the eighth embodiment, the exhaust finisher assembly 712 includes a baffle structure 758 with two interior surfaces 760a and 760b. The intersection of the two interior surfaces 760a and 760b that defines an off-center projection, as viewed in cross-section in FIG. 25. The projection at the intersection of the two interior surfaces 760a and 760b is off-center relative to the two exhaust openings such that the projection is closer to one of the exhaust openings than to the other of the exhaust openings in a manner opposite the location of the projection in the seventh embodiment. Further, each of the two interior surfaces 760a and 760b is curved, as viewed in FIG. 25, with each of two interior surfaces 760a and 760b being concaved.

Ninth Embodiment

Figure 26:
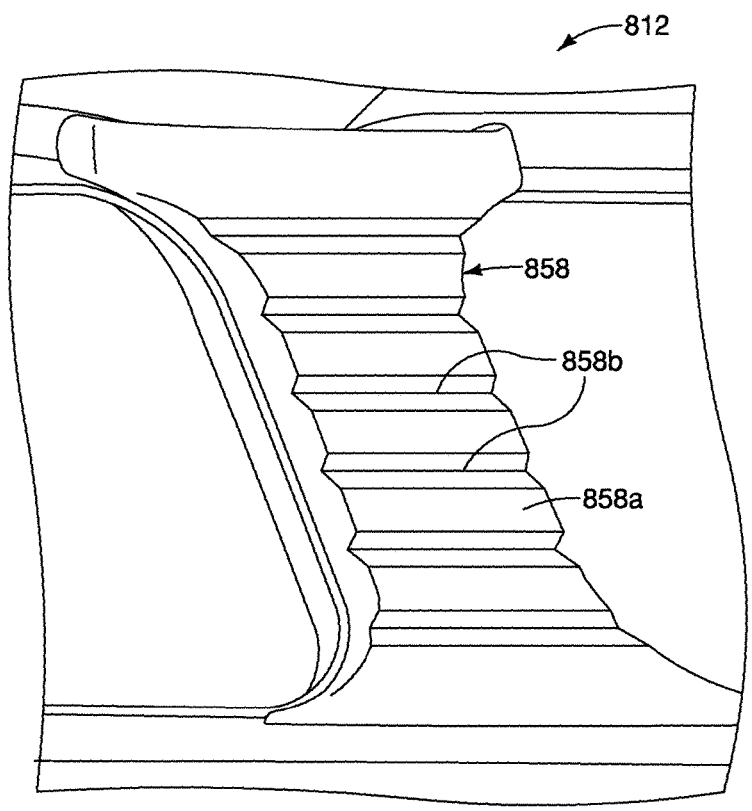
FIG. 26 is a plan view of a baffle structure of an exhaust finisher assembly as viewed from within a hollow interior of the exhaust finisher assembly in accordance with a ninth embodiment.
Figure 27:
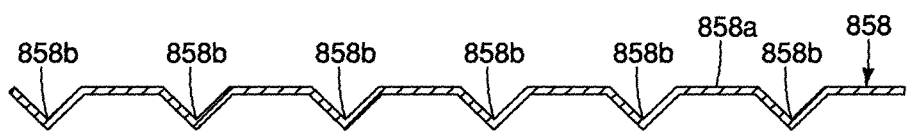
FIG. 27 is a cross-sectional view of the baffle structure shown removed from the exhaust finisher assembly in accordance with the ninth embodiment.

Referring now to FIGS. 26-27, an exhaust finisher assembly 812 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

In the ninth embodiment, the exhaust finisher assembly 812 includes a baffle structure 858 that includes a generally flat surface 858a that includes a plurality of horizontal grooves 858b.

Tenth Embodiment

Figure 28:
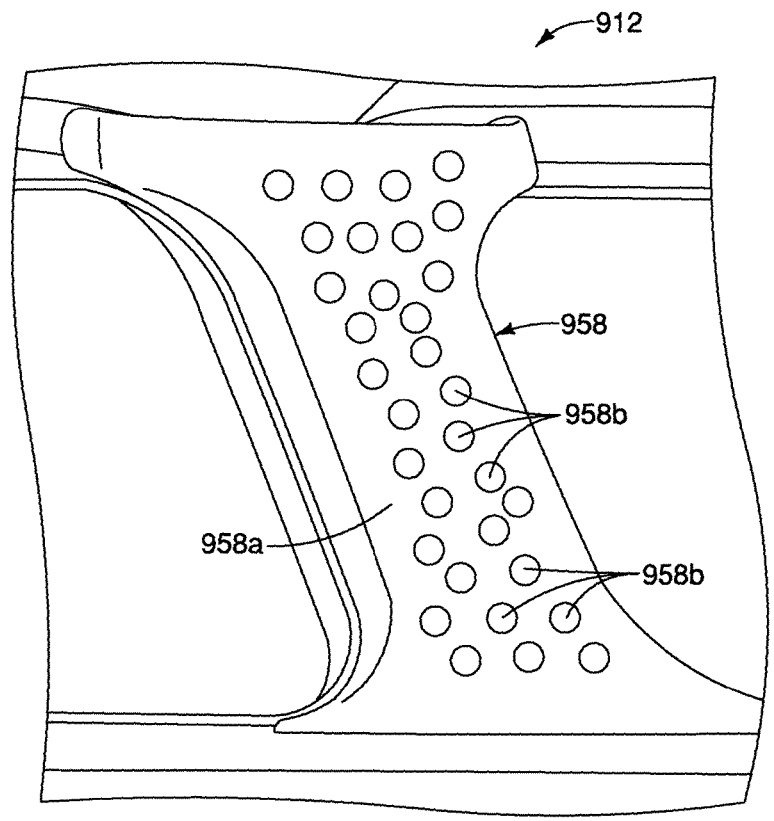
FIG. 28 is a plan view of a baffle structure of an exhaust finisher assembly as viewed from within a hollow interior of the exhaust finisher assembly in accordance with a tenth embodiment.
Figure 29:
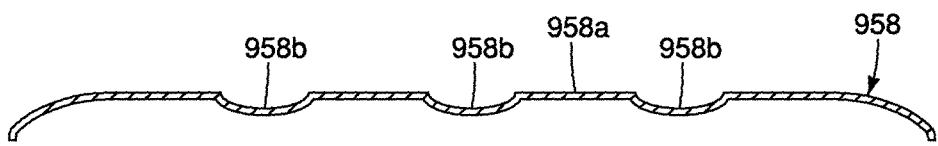
FIG. 29 a cross-sectional view of the baffle structure shown removed from the exhaust finisher assembly in accordance with the tenth embodiment.

Referring now to FIGS. 28-29, an exhaust finisher assembly 912 in accordance with a tenth embodiment will now be explained. In view of the similarity between the first and tenth embodiments, the parts of the tenth embodiment that are identical to the parts of the first embodiment will be given the same reference numerals as the parts of the first embodiment. Moreover, the descriptions of the parts of the tenth embodiment that are identical to the parts of the first embodiment may be omitted for the sake of brevity.

In the tenth embodiment, the exhaust finisher assembly 912 includes a baffle structure 958 that includes a generally flat surface 958a that includes a plurality of dimples 958b. The dimples 958b are basically concave depressions formed in the surface 958a.

The elements of vehicle body structure and the exhaust system (other than the exhaust finisher assembly) are conventional components that are well known in the art. Since elements of vehicle body structure and exhaust systems are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the exhaust finisher assembly. Accordingly, these terms, as utilized to describe the present invention should be interpreted relative to a vehicle equipped with the exhaust finisher assembly.

The term "configured" as used herein to describe a component, section or part of a device includes structure that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A rear exhaust finisher assembly, comprising:
   a vehicle body structure;
   a rear bumper fascia having an inboard surface and an outboard surface, the rear bumper fascia being attached to a rear end of the vehicle body structure, the rear bumper fascia having at least one opening that extends from the inboard surface through to a rearward facing section of the outboard surface;
   an exhaust system installed beneath the vehicle body structure and including at least one exhaust pipe that extends rearward toward the rear bumper fascia; and
   an exhaust finisher having a housing with a hollow interior, an input end and an output end, with a gas-flow direction being defined as a direction in which gases move from the input end to the output end, the exhaust finisher extending through the at least one opening and being attached to the rear bumper fascia, the input end extending inboard from the inboard surface of the rear bumper fascia and the output end extending through and out of the at least one opening of the rear bumper fascia and further extending rearward relative to the rearward facing section of the outboard surface of the rear bumper fascia, the input end having an inlet opening that is open to the hollow interior and is positioned adjacent to the exhaust pipe receiving exhaust gases therefrom, the output end having two exhaust openings adjacent to one another, the two exhaust openings being open to the hollow interior, with a baffle structure being located at the output end, being defined between the two exhaust openings and being shaped and configured to cause exhaust gases moving in the gas-flow direction through the hollow interior of exhaust finisher to experience at least a partial change in direction as the exhaust gases move past the baffle structure.

2. The rear exhaust finisher assembly according to claim 1, wherein
   the baffle structure includes an interior surface that faces the hollow interior of the housing, the interior surface having a projection that extends from a lower area of the baffle structure to an upper area of the baffle structure and further extends within the hollow interior in a direction opposite the gas-flow direction toward the input end.

3. The rear exhaust finisher assembly according to claim 2, wherein
   the projection is defined by curved surfaces as viewed from above.

4. The rear exhaust finisher assembly according to claim 2, wherein
   the projection is centered between the two exhaust openings.

5. The rear exhaust finisher assembly according to claim 2, wherein
   the projection is off-center between the two exhaust openings such that the projection is closer to a first of the exhaust openings than a second of the exhaust openings.

6. The rear exhaust finisher assembly according to claim 2, wherein the projection defines a ridge that extends along the projection, the interior surface of the baffle structure being defined by a first surface section that extends from the ridge in a first lateral direction, and a second surface section that extends from the ridge in a second lateral direction opposite the first lateral direction, the first surface section and the second surface section having symmetrical curved serpentine shapes as viewed from above.

7. The rear exhaust finisher assembly according to claim 6, wherein
the ridge of the projection extends from a lower side of the housing to an upper side of the housing between the two exhaust openings and is inclined relative to vertical by an angle of between 20 and 40 degrees.

8. The rear exhaust finisher assembly according to claim 7, wherein
the ridge of the projection is off-center between the two exhaust openings such that the projection is closer to a first of the exhaust openings than a second of the exhaust openings.

9. The rear exhaust finisher assembly according to claim 1, wherein
the baffle structure includes an interior surface that faces the hollow interior of the housing, the interior surface having a semi-circular shape as viewed from above.

10. The rear exhaust finisher assembly according to claim 1, wherein
the baffle structure extends from a lower side of the housing to an upper side of the housing between the two exhaust openings and is inclined relative to vertical by an angle of between 20 and 40 degrees.

11. The rear exhaust finisher assembly according to claim 1, wherein
the housing of the exhaust finisher includes a lower shell portion and an upper shell portion, with a lower section of the baffle structure extending upward from a rearward area of the lower shell portion and an upper section of the baffle structure extends downward from a rearward area of the upper shell portion.

12. The rear exhaust finisher assembly according to claim 1, wherein
the baffle structure includes an interior surface that is defined by a plurality of planar panels fitted together.

13. The rear exhaust finisher assembly according to claim 1, wherein
the baffle structure includes an interior surface that is planar and includes a plurality of grooves formed therein facing the hollow interior.

14. The rear exhaust finisher assembly according to claim 1, wherein
the baffle structure includes an interior surface that is planar and includes a plurality of dimples formed therein facing the hollow interior, each of the plurality of dimples being a concaved area of the interior surface.

15. The rear exhaust finisher assembly according to claim 11, wherein
the hollow interior of the housing of the exhaust finisher is defined by the lower shell portion and the upper shell portion, the hollow interior being open and free of any structures except the baffle structure, the baffle structure being located at the output end of the hollow interior, adjacent and between the two exhaust openings.

16. A rear exhaust finisher assembly, comprising:
a vehicle body structure;
a rear bumper fascia having an inboard surface and an outboard surface, the rear bumper fascia being attached to a rear end of the vehicle body structure, the rear bumper fascia having at least one opening;
an exhaust system installed beneath the vehicle body structure and including at least one exhaust pipe that extends rearward toward the rear bumper fascia; and
an exhaust finisher having a housing with a hollow interior, an input end and an output end, with a gas-flow direction being defined as a direction in which gases move from the input end to the output end, the exhaust finisher extending through the at least one opening and being attached to the rear bumper fascia, the input end extending inboard from the inboard surface of the rear bumper fascia and the output end extending rearward from the outboard surface of the rear bumper fascia, the input end having an inlet opening that is open to the hollow interior and is positioned adjacent to the exhaust pipe receiving exhaust gases therefrom, the output end having two exhaust openings adjacent to one another, the two exhaust openings being open to the hollow interior, with a baffle structure located at the output end of the exhaust finisher spaced apart from the input end, the baffle structure being defined between the two exhaust openings and being shaped and configured to cause exhaust gases moving in the gas-flow direction through the hollow interior of exhaust finisher to experience at least a partial change in direction as the exhaust gases move past the baffle structure.

17. The rear exhaust finisher assembly according to claim 16, wherein
the baffle structure is vertically oriented between and adjacent to the two exhaust openings.

18. The rear exhaust finisher assembly according to claim 16, wherein
the housing of the exhaust finisher includes a lower shell portion and an upper shell portion, with a lower section of the baffle structure extending upward from a rearward area of the lower shell portion and an upper section of the baffle structure extends downward from a rearward area of the upper shell portion.

19. The rear exhaust finisher assembly according to claim 18, wherein
the hollow interior of the housing of the exhaust finisher is defined by the lower shell portion and the upper shell portion, the hollow interior being open and free of any structures except the baffle structure.

* * * * *